United States Patent [19]
Peczkowski

[11] Patent Number: 4,928,484
[45] Date of Patent: May 29, 1990

[54] NONLINEAR MULTIVARIABLE CONTROL SYSTEM

[75] Inventor: Joseph L. Peczkowski, Granger, Ind.

[73] Assignee: Allied-Signal Inc., Morristown, N.J.

[21] Appl. No.: 286,690

[22] Filed: Dec. 20, 1988

[51] Int. Cl.$^5$ .................................................. F02K 3/00
[52] U.S. Cl. ........................................ 60/240; 60/243; 60/39.27; 60/39.281
[58] Field of Search .............. 60/235, 240, 243, 39.27, 60/39.281, 39.29

[56] References Cited

U.S. PATENT DOCUMENTS

| | | | |
|---|---|---|---|
| 3,852,956 | 12/1974 | Martin | 60/224 |
| 3,882,672 | 5/1975 | Bauerfeind | 60/39.281 |
| 3,987,620 | 10/1976 | Giordano et al. | 60/39.281 |
| 4,188,781 | 2/1980 | Johnson et al. | 60/39.281 |
| 4,220,993 | 9/1980 | Schloeman | 60/39.281 |
| 4,275,557 | 6/1981 | Marvin et al. | 60/39.281 |
| 4,276,744 | 7/1981 | Pisano | 60/39.161 |
| 4,411,595 | 10/1983 | Pisano | 416/1 |
| 4,594,849 | 6/1986 | Kenison et al. | 60/39.29 |
| 4,625,510 | 12/1986 | Evans | 60/39.281 |
| 4,849,895 | 7/1989 | Kervistin | 60/39.75 |

*Primary Examiner*—Donald E. Stout
*Attorney, Agent, or Firm*—Leo H. McCormick, Jr.; Ken C. Decker

[57] ABSTRACT

There is disclosed an apparatus for and method of controlling a plant such as a turbojet engine wherein a model of the plant is created and plant performance request signals are applied to both the plant and the model of the plant. The performance of the model of the plant is used to modify the performance request signals supplied to the plant. Plant and plant model responses may also be compared to monitor degradation in performance of the plant. To adapt the scheme to nonlinear plants, the creation of a plurality of linear plant models each mimicking plant operation over a different limited portion of the toal range of plant performance is employed and there is a plant model for each of several different plant operation points about each of which, the actual plant operation is approximately linear. The technique may further include the creating of a model of the inverse of the plant, in which case, the step of applying plant performance request signals to both the plant and the model of the plant includes passing the performance request signals through the model of the inverse of the plant and subsequently to both the plant and the model of the plant. A preliminary step of screening the plant performance requests and modifying any signals requesting an excessively abrupt change in plant performance is also disclosed.

11 Claims, 4 Drawing Sheets

NONLINEAR MULTIVARIABLE CONTROL SYSTEM

SUMMARY OF THE INVENTION

The present invention relates generally to control systems for engines such as turbojet engines or similar plants and more particularly to a control system for a nonlinear plant which uses one or more models of the plant as part of the control system.

The present inventor is coauthor along with Michael K. Sain of a paper entitled SYNTHESIS OF SYSTEM RESPONSES: A NONLINEAR MULTIVARIABLE CONTROL DESIGN APPROACH which was presented at the June, 1985 American Control Conference in which coordinated feedforward and feedback techniques for control of linear as well as nonlinear plants is discussed. In that paper, a set of three matrix equations which determine the design of a linear multivariable control system are developed. Extension of the techniques to nonlinear designs is by developing sets of the three equations for sufficiently many different operating points that the plant may be considered to be linear over a range near each of those operating points. That is, one set of three matrix equations applies to an assumed linear range of operating points and when operation is too remote for that set of equations to apply, the system changes over to the next more appropriate neighboring set of equations. There is also developed in that paper a model of a turbojet engine, which model was used to simulate the real (controlled) engine in computer simulation of the control schemes set forth in the paper. The engine model was controlled rather than forming a part of the controlling system. Reference may be had to that paper and to the wealth of background materials cited therein for a more detailed discussion of nonlinear multivariable control systems generally.

Among the several objects of the present invention may be noted the provision of a unique feedforward and feedback control structure for a plant which includes a nonlinear model of the plant and a nonlinear model of the plant inverse as dynamic elements of the control system; the provision of an engine control method and apparatus characterized by fast smooth response over the entire engine operating range; the provision of a unique method and apparatus for control of a turbojet engine which are adaptable to a wide variety of other plants; the provision of an engine control system capable of controlling a multiplicity of nonlinear engine parameters; the provision of a method of controlling an engine or other plant which offers insight into plant dynamics and provides an opportunity for influence of the engine responses; the provision of a method of controlling an engine or other plant which employs a model of the plant to be controlled to mimic plant behavior in response to various input conditions; the provision of an engine control technique which affords the designer a greater latitude in specifying responses and sensitivities; and the provision of an engine control technique characterized by ease and simplicity as compared to current methods. These as well as other objects and advantageous features of the present invention will be in part apparent and in part pointed out hereinafter.

In general, a control arrangement for a turbojet engine or similar plant of the type having control signal responsive engine controls and engine performance monitoring sensors is responsive to one or more operator inputs and to the engine performance monitoring sensors to provide control signals to the engine controls. The control arrangement may include a model of the engine and a model of the inverse of the engine coupled together in an error correction feedback loop. The control arrangement may also include a model of the inverse of the engine in the controller coupled to supply control signals to the engine and an arrangement for feeding back engine performance signals to the model of the inverse of the engine.

Also in general and in one form of the invention, a nonlinear multivariable control system for an engine or like plant which is responsive to input request signals for effecting plant operation in accordance with those input request signals has an input for receiving the request signals and providing output signals in response thereto. A model of the plant for simulating plant performance and providing outputs indicative of such performance in response to signals from the input means is included in the control system along with a feedback circuit for returning the plant model output signals to the input. The input includes circuitry for comparing the input request signals and the returned output signals, and for providing error output signals to the model of the plant to enable the plant model to more nearly exhibit the requested operation. The request signals are also supplied to the plant and a second feedback circuit is effective to compare plant performance with the corresponding performance of the model of the plant and to applying corrective signals to the plant to modify plant performance in response to discrepancies between the plant performance and the performance of the model of the plant.

Still further and in general, the method of controlling a plant includes the steps of creating a model of the plant and applying plant performance request signals to both the plant and the model of the plant. The performance of the model of the plant is used to modify the performance request signals supplied to the plant.

BRIEF DESCRIPTION OF THE DRAWING

Corresponding reference characters indicate corresponding parts throughput the several views of the drawing.

The exemplifications set out herein illustrate a preferred embodiment of the invention in one form thereof and such exemplifications are not to be construed as limited the scope of the disclosure or the scope of the invention in any manner.

DESCRIPTION OF THE PREFERRED EMBODIMENT

Figure 1:
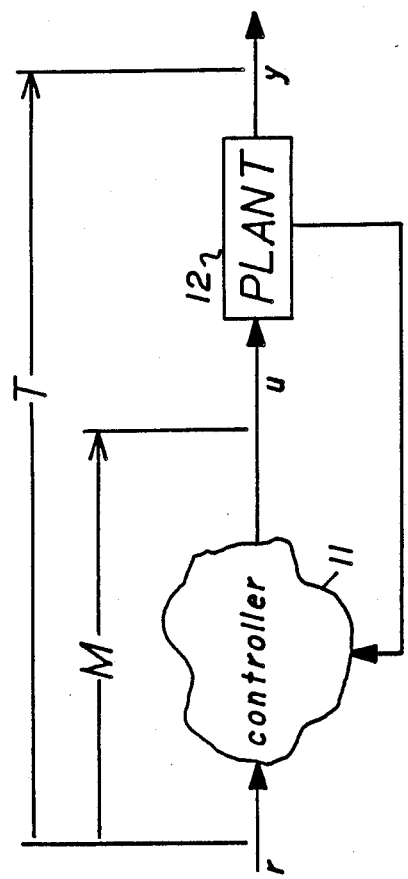
FIG. 1 is a generalized schematic diagram showing variables in a total synthesis design approach.

Referring first to FIG. 1, there is shown a generalized controller 11 and a generalized linear plant 12. The philosophy of total synthesis is to allow the designer to choose attainable responses M and T. the closed loop response relating an input vector r and the plant response or output vector y is y =Tr and the acceptable control responses are given by u +Mr.

Figure 2:
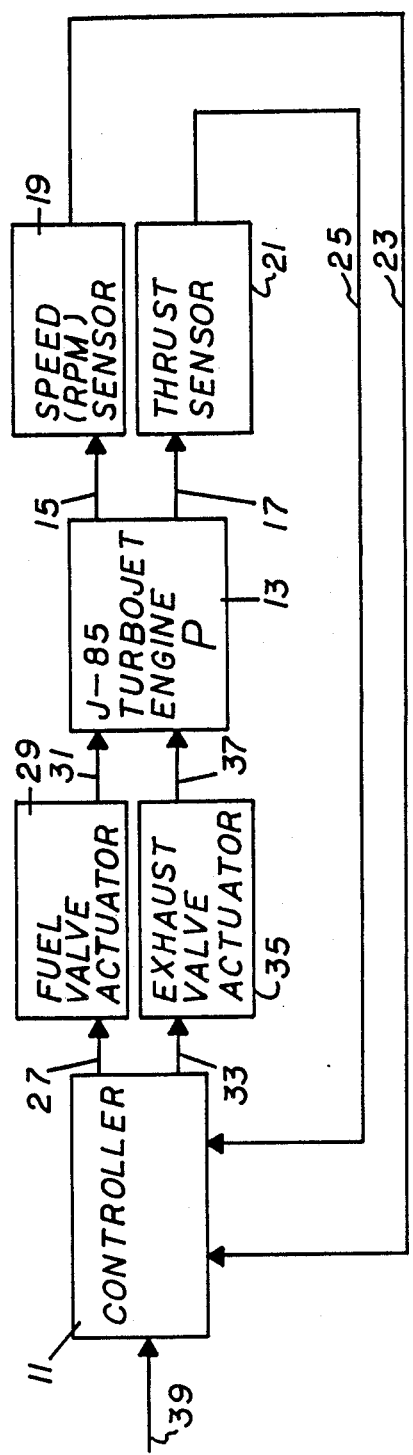
FIG. 2 is a schematic diagram of an overall system for controlling a two input-two output engine according to the invention.

Referring now to FIG. 2, there is shown a generalized controller 11 in an illustrative environment of feedback control of a turbojet engine 13. To illustrate the present invention, only the engine outputs or performance parameters of speed (RPM) 15 and thrust 17 are shown, but other engine performance traits may, of course, be monitored and controlled. Appropriate sensors 19 and 21 are provided to monitor the actual engine speed 15 and thrust 17 respectively. Signals indicative of these traits are feed back to the controller 11 on lines 23 and 25 respectively. The controller 11 provides fuel supply request signals on line 27 which control a transducer 29 and that transducer, for example a solenoid controlled valve, in turn controls fuel supply to the engine 13 as depicted by line 31. Similarly, the controller 11 provides air supply request signals on line 33 which control a transducer 35 which in turn controls air supply to the engine 13 as depicted by line 37. Lastly, the controller 11 receives engine performance request signals on line 39.

Figure 3:
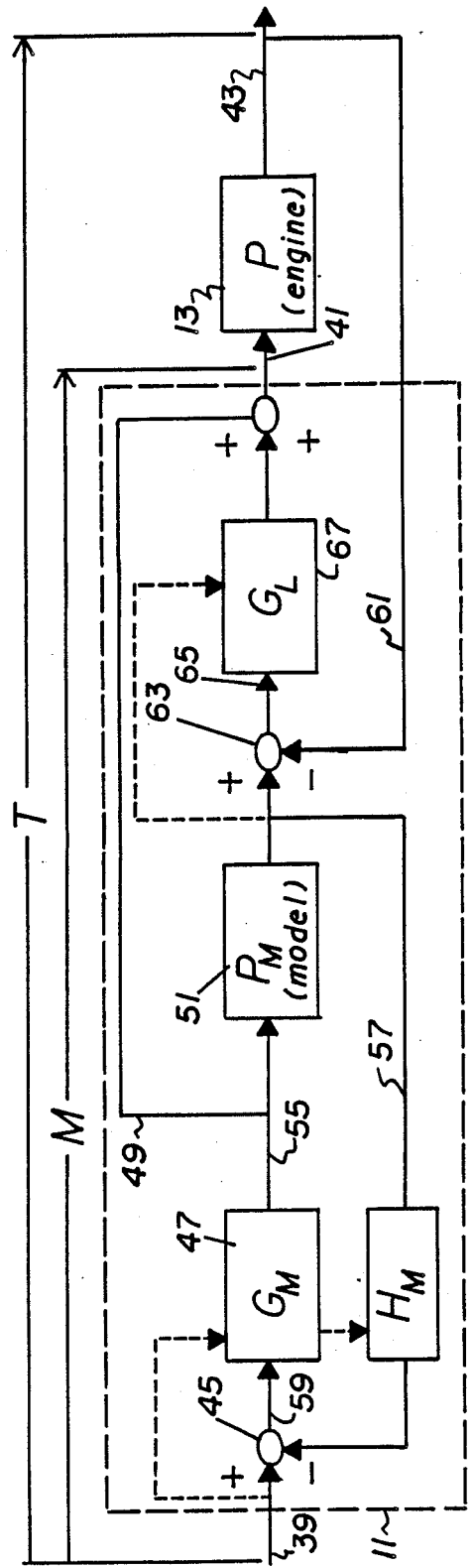
FIG. 3 is a schematic diagram of the system of FIG. 2 showing in greater detail a controller according to the invention in one form.

In FIG. 3, the controller 11 is illustrated within the dotted lines. One goal of the present invention is to provide a nonlinear multivariable control system for an engine or like plant which is responsive to input request signals on line 39 to effect plant operation in accordance with those input request signals. While two variables (air and fuel) and two output variables (thrust and speed) are depicted in FIG. 2, only a single engine input line 41 and single engine performance trait 43 are depicted in FIG. 3 to avoid confusing duplication. Extension to the nonlinear multivariable case will be clear as the discussion progresses, but briefly, there is one nonlinear plant model. From this nonlinear plant model, linear plant models are identified at selected points on desired output schedules. Then a corresponding set of linear plant inverse models is computed from the linear plant models. This set of plant inverse models is used to form the nonlinear controller elements G and G which are used in the model loop and the plant loop respectively. The model loop uses the full range nonlinear plant model and nonlinear controller G to produce the desired response action M and T by means of closed loop actions. The plant loop uses nonlinear controller G in a closed loop around the real plant to track or follow the desired response action T of the model loop.

The controller 11 of FIG. 3 includes an input circuit 45 and 47 for receiving the request signals and providing output signals on line 49 in response thereto. A model 51 of the engine or similar plant simulates plant performance and provides output signals on line 53 indicative of such performance in response to signals from the input circuit on line 55. The signals on lines 49 and 55 are, of course, the same. The plant model output signals on line 53 are feed back on line 57 to the input circuit 45 to be compared with the input request signals on line 39 and error output signals resulting on line 59 are returned by way of circuit 47 to the model 51 of the plant to enable the plant model to more nearly exhibit the requested operation. Line 49 functions to supply the input means output signals to the plant 13. A second feedback circuit 61 cooperates with output 43 to compare, in circuit 63, actual engine 13 performance with the corresponding performance of the model 51 of the engine and for applying corrective signals on line 65 by way of control circuit 67 to the engine to modify engine performance in response to discrepancies between the engine performance and the performance of the model of the engine. Circuit 67 may be further adapted to provide a warning indication when a comparison of the plant response 61 and plant model response 57 to a common request signal 65 indicates an excessive discrepancy between those responses. By monitoring the performance of the engine 13 and the performance of the engine model 51 under the same requests or inputs, a measure of engine condition and/or the performance of sensors such as 19 and 21 is possible. This redundancy allows detection of degradation in engine or sensor performance leading to enhanced reliability of engine performance.

Figure 4:
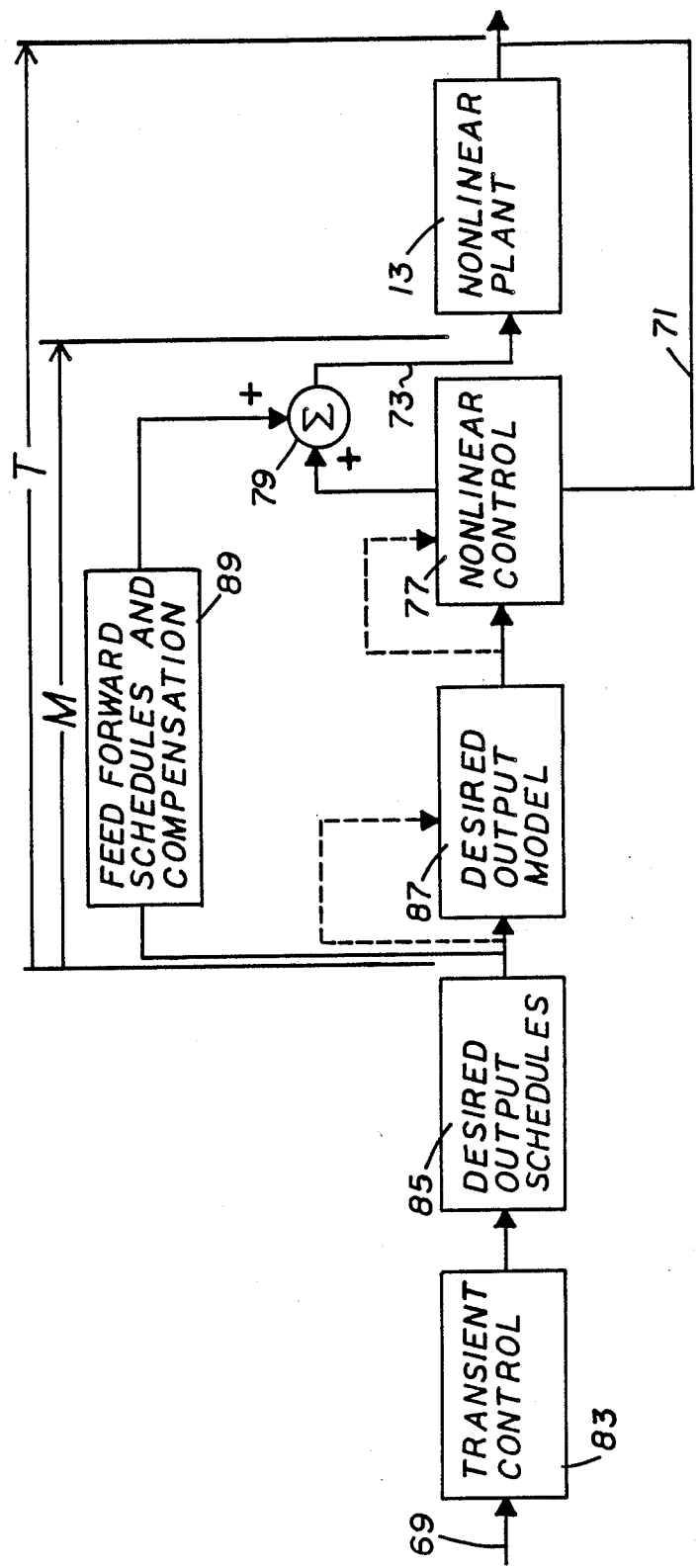
FIG. 4 is a schematic diagram illustrating a more detailed form of controller according to the invention suitable for incorporation into FIG. 2.
Figure 5:
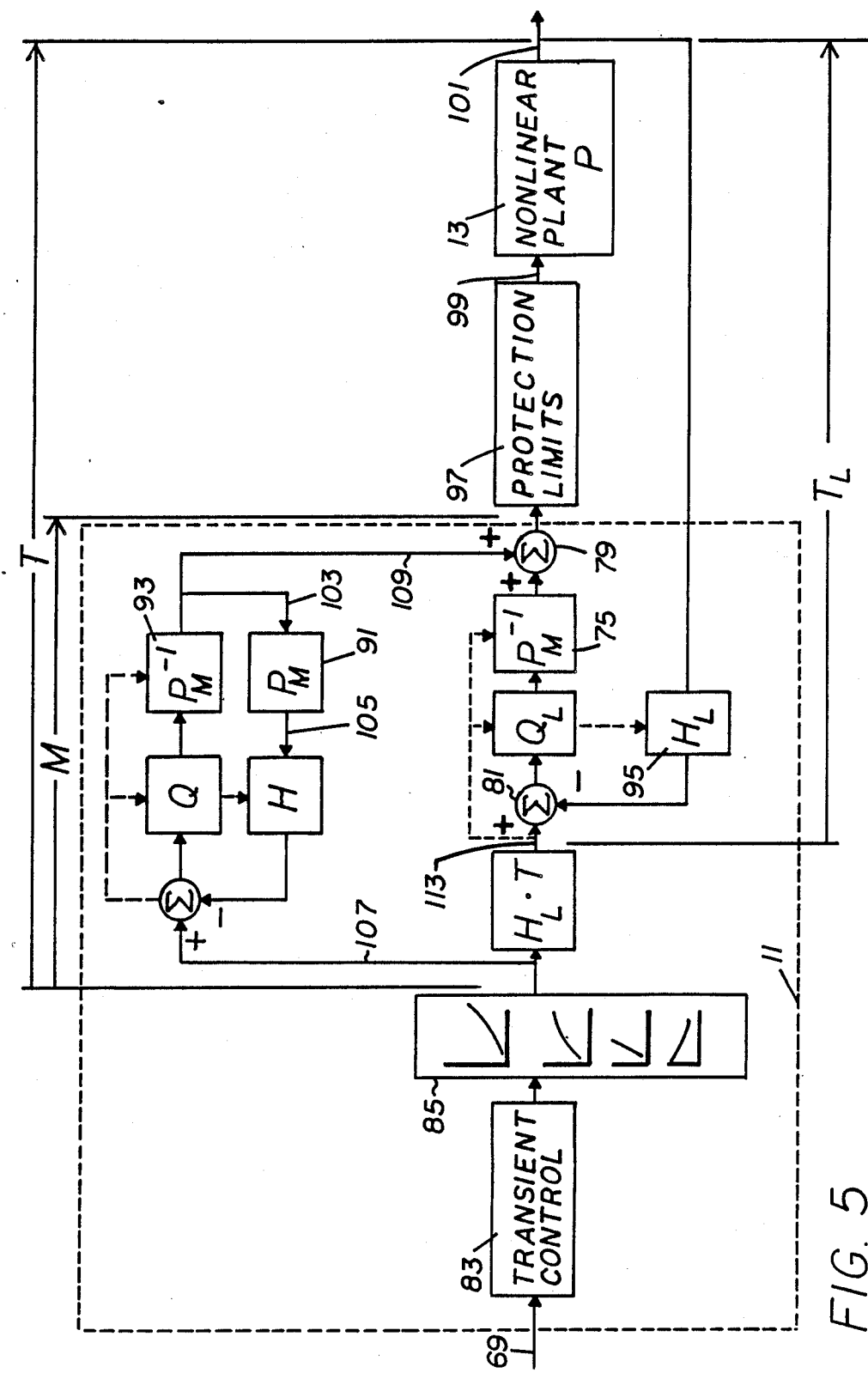
FIG. 5 schematically illustrates the details of an engine controller incorporating the principles of the present invention.

FIGS. 4 and 5 show some specific and unique features of the version of control 11 discussed in conjunction with FIG. 3. In FIG. 4, the control arrangement for a turbojet engine or similar plant 13 still utilizes control signal responsive engine actuators and engine performance monitoring sensors as discussed in conjunction with FIG. 2. The control arrangement is responsive to at least one operator input on line 69 and to the engine 13 performance monitoring sensors shown collectively on line 71 to provide control signals on line 73 to the engine controls. The desired engine performance signals are also supplied by way of feedforward circuit 89 as control signals to the engine.

In FIG. 5, the control arrangement comprises a model 75 of the inverse of the engine which forms a part of nonlinear control module 77 which is coupled to supply control signals by way of summing circuit 79 to the engine. Line 71 and summing circuit 81 function to feed back engine performance signals to the model 75 of the inverse of the engine. Desired engine performance signals are generated in response to operator inputs on line 69 by the transient control circuit 83 and desired output schedule table 85. Desired output schedules for four nonlinear variables are depicted in the table 85. The desired engine performance signals are supplied to the model 75 of the inverse of the engine which forms a part of the desired output response model 87. Feedforward circuit 89 includes a model 91 of the engine and a second model 93 of the inverse of the engine coupled together in an error correcting feedback loop as seen in FIG. 5.

The control of the present invention has been described as nonlinear and multivariable. Each variable such as thrust and speed discussed in conjunction with FIG. 2 is treated in the same way and by like circuitry in any one of the embodiments of FIGS. 3-5; however, the circuitry as thus far discussed is essentially linear in nature. Extension to the nonlinear case is by dividing the overall operating range of the engine into sufficient number of intervals that engine operation within any given one of the intervals is essentially linear. Thus the model of the engine includes a plurality of linear engine models each mimicking engine operation over a different limited portion of the total range of engine performance, there being an engine model for each of several different engine operating points about each of which, the actual engine operation is approximately linear.

Similarly, each model of the inverse of the engine includes a plurality of linear inverse engine models each mimicking the inverse of engine operation over a different limited portion of the total range of engine performance, there being an inverse engine model for each of several different engine operating points about each of which, the actual engine operation is approximately linear. Scheduling of the linear control elements is shown by dotted lines in Figure 4 and 5.

Selection of a particular operating point and, thus, a particular linear engine model and a a particular linear inverse engine model is effected in the desired output schedule circuitry 85 which functions as a look-up table over the entire nonlinear operating range of the engine for each of the variables to select the correct models for a given approximately linear range of operation as determined by the operator input on line 69. The models selected may be best thought of as sets of matrices with each matrix of the set corresponding to a particular operating range and with each matrix being preferably square having entries each of which is a Laplace transform. When viewed in this way, engine operation is described by a series of ordinary differential equations. Each differential equation describes how the engine or other plant responds, i.e., engine thrust or speed, within a selected range to a particular physical input such as fuel or air as determined by the exhaust nozzle area. Those differential equations which are functions of time are transformed into a series of algebraic equations which are functions of the transform variables by the designer of the control and based on tests of the engine to be solved by conventional matrix techniques by the circuitry for a particular set of input conditions. Thus, the matrix entries are rational functions (quotients of polynomials in s) and an illustrative matrix P(s) for a turbojet engine as well as the inverse P(s)−1 -1 of the matrix for a particular operating point, namely 100% power and sea level conditions are:

$$P(s) = \frac{\begin{bmatrix} 5.4(.01s + 1) & 56.1(0.1s + 1) & -2704(.01s + 1) \\ .13(1.5s + 1) & -2.7 & 336(.31s + 1) \\ 2.4(.29s + 1) & 68.3(.42s + 1)(.01s + 1) & 951(.76s + 1) \end{bmatrix}}{(.50s + 1)(.01s + 1)}$$

and $$P(s) = \frac{\begin{bmatrix} .18(.23s + 1)(.01s + 1) & 1.7(0.1s + 1)(.007s + 1) & -.083(.01s + 1) \\ -.005(-.2s + 1) & -.08(.01s + 1) & .015(.01s + 1) \\ -.0001(.74s + 1)(.01s + 1) & .0017(.01s + 1)(.031s + 1) & .00015(.01s + 1) \end{bmatrix}}{(.009s + 1)}$$

The above engine model matrices are illustrative of three inputs on line 103 to the engine model 91, namely, fuel flow (f), exhaust nozzle area (n) and turbine vane position (v) with responses from the model on line 105 of engine speed (s), engine temperature (e) and thrust (t) as the correlative outputs. Engine 13 output on line 100 and input on line 99 should follow the same general relationship. The input vector (f,n,v) and the output vector (s,e,t) are related by the above matrix as the plant model matrix operating (on the left as is conventional) on the output vector to give the output vector as follows:

$$\begin{bmatrix} s \\ e \\ t \end{bmatrix} = P(s) \begin{bmatrix} f \\ n \\ v \end{bmatrix}.$$

The remaining portions of the circuit of Figure 5 may be similarly described in terms of matrix equations or transformations for a particular operating point, it being remembered that different matrices will be selected for sufficiently many different operating points that the performance may be assumed to be linear within a range of the selected operating point. The designer chooses T, the desired closed loop response relating an input vector R on line 69 and the engine response or output vector Y on line 101 with:

$$Y = TR.$$

The desired control response M operating on the vector input on line 107 to give the output on line 109 is:

Within the feedforward loop:

$$Q = T(I - HT)^{-1}$$

where I is the conventional identity matrix. An equation for the response matrix is:

$$T = (I + PGH)^{-1}PG = SPG$$

with the corresponding comparison sensitivity matrix equation:

For the trim loop feeding back to summer 81 with overall response $T_L$ between lines 101 and 113, the matrices are similarly determined yielding a design equation:

$$G = P_m^{-1} Q_L = P_M^{-1} S_L^{-1} T$$

and $$H = T^{-1}(I - S).$$

While the explanations of FIGS. 4 and 5 mutually support one another, the two controls do differ slightly. Plant performance feedback on line 71 of Figure 4 is modified by circuit 95 of the trim loop so that the information actually feed back is compatible with the particular implementation of circuits 77, 87 and 89. Also, FIG. 5 includes optional protective circuitry 97 to ensure against the control requesting performance of the engine which is beyond its safe operating limits.

From the foregoing, it is now apparent that a novel plant control arrangement and method have been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A multivariable control system for an engine or like plant which is responsive to input request signals for effecting plant operation in accordance with those input request signals comprising:
   input means for receiving the request signals and providing output signals in response thereto;
   a model of the plant for simulating plant performance and providing outputs indicative of such performance in response to signals from the input means;
   first feedback means for returning the plant model output signals to the input means;
   the input means including means for comparing the input request signals and the returned output signals, and for providing error output signals to the model of the plant to enable the plant model to more nearly exhibit the request operation;
   means for supplying the input means output signals to the plant;
   second feedback means for comparing a plant performance with the corresponding performance of the model of the plant and for applying corrective signals to the plant to modify plant performance in response to discrepancies between the plant performance and the performance of the model of the plant.

2. The multivariable control system of claim 1 wherein the model of the plant comprises a plurality of linear plant models each mimicking plant operation over a different limited portion of the total range of plant performance.

3. The multivariable control system of claim 2 wherein there is a plant model for each of several different plant operating points about each of which, the actual plant operation is approximately linear.

4. A control arrangement for a turbojet engine having control signal responsive engine actuators and engine performance monitoring sensors, the control arrangement being responsive to at least one operator input and to the engine performance monitoring sensors to provide control signals to the engine actuators, the control arrangement comprising a model of the engine and a model of the inverse of the engine coupled together in an error correcting feedback loop.

5. The control arrangement of claim 4 further comprising a second model of the inverse of the engine coupled to supply control signals to the engine, and means for feeding back engine performance signals to the second model of the inverse of the engine.

6. A control arrangement for a turbojet engine having control signal responsive engine actuators and engine performance monitoring sensors, the control arrangement being responsive to at least one operator input and to the engine performance monitoring sensors to provide control signals to the engine actuators, the control arrangement comprising a model of the inverse of the engine coupled to supply control signals to the engine and means for feeding back engine performance signals to the model of the inverse of the engine.

7. The control arrangement of claim 6 further comprising means responsive to an operator input for generating desired engine performance signals, means for supplying the desired engine performance signals to the model of the inverse of the engine, and means for supplying the desired engine performance signals as control signals to the engine.

8. The control arrangement of claim 7 wherein the means for supplying the desired engine performance signals as control signals to the engine includes a model of the engine and a second model of the inverse of the engine coupled together in an error correcting feedback loop.

9. The control arrangement of claim 8 wherein the model of the engine includes a plurality of linear engine models each mimicking engine operation over a different limited portion of the total range of engine performance, there being an engine model for each of several different engine operating points about each of which, the actual engine operation is approximately linear.

10. The control arrangement of claim 8 wherein each model of the inverse of the engine includes a plurality of linear inverse engine models each mimicking the inverse of engine operation over a different limited portion of the total range of engine performance, there being an inverse engine model for each of several different engine operating points about each of which, the actual engine operation is approximately linear.

11. The control arrangement of claim 8 wherein the model of the engine is nonlinear and includes a plurality of linear engine models each mimicking engine operation over a different limited portion of the total range of engine performance, there being an engine model for each of several different engine operating points about each of which, the actual engine operation is approximately linear.

* * * * *